UNITED STATES PATENT OFFICE.

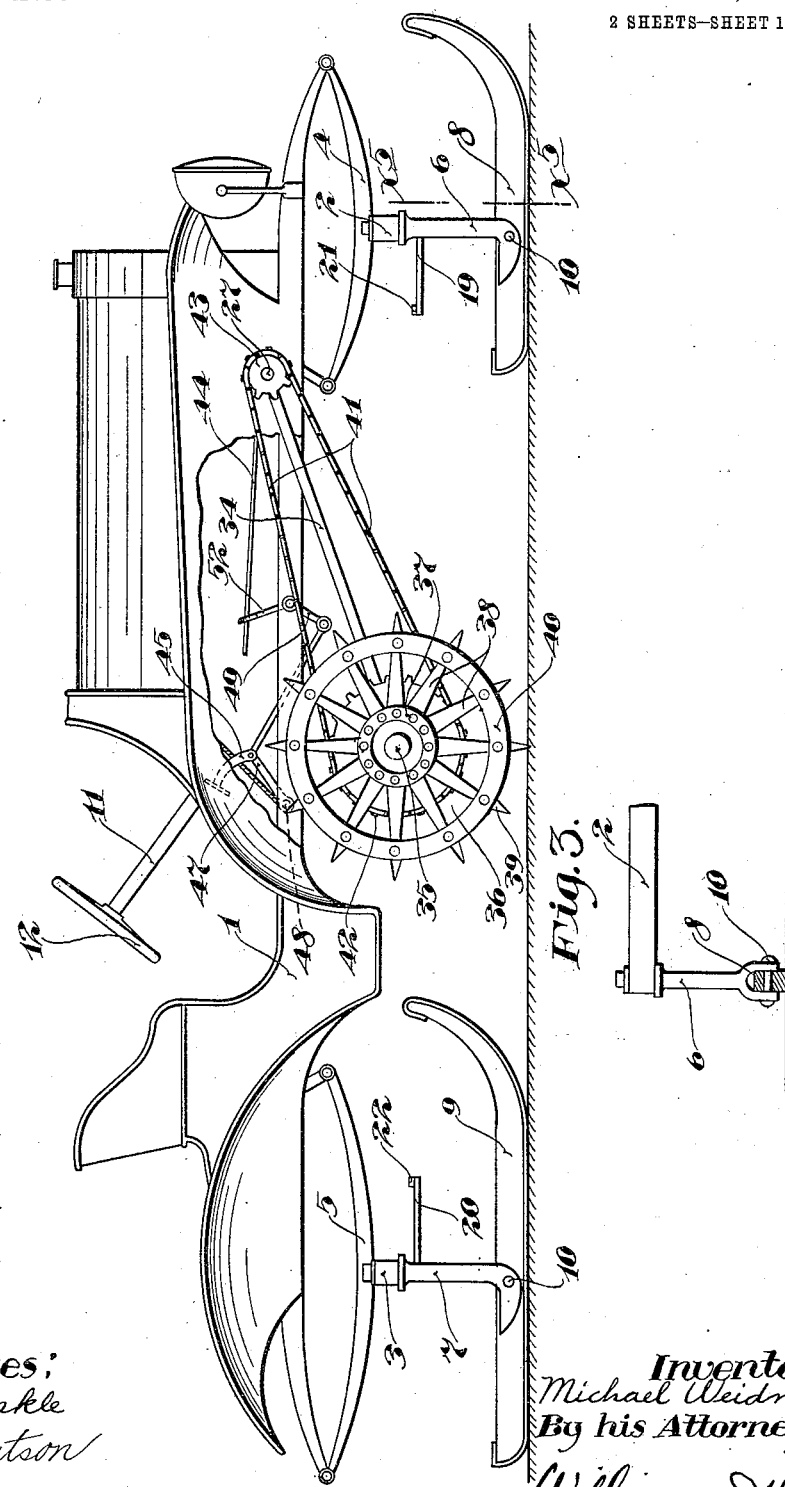

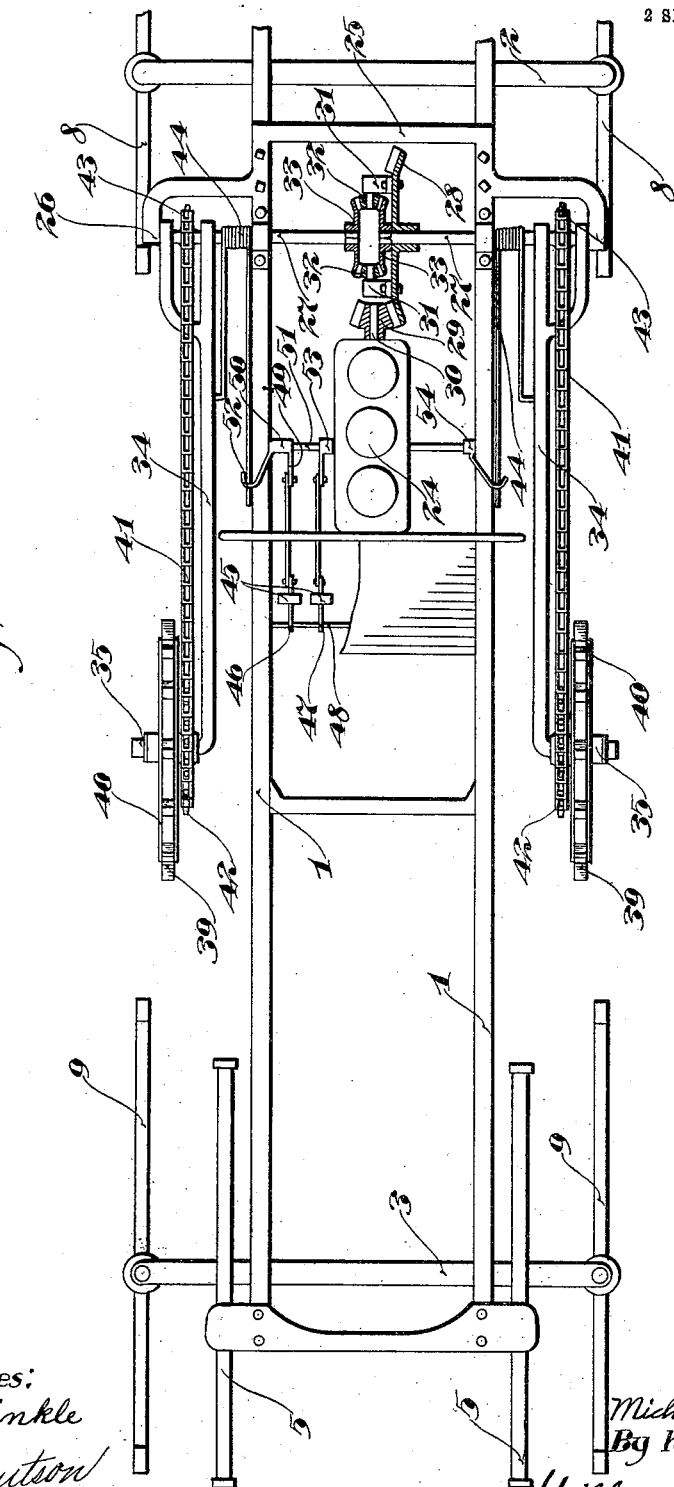

MICHAEL WEIDNER, OF LAKE HENRY, MINNESOTA.

AUTOSLED.

1,083,312.

Specification of Letters Patent.

Patented Jan. 6, 1914.

Application filed October 2, 1912. Serial No. 723,549.

*To all whom it may concern:*

Be it known that I, MICHAEL WEIDNER, a citizen of the United States, residing at Lake Henry, in the county of Stearns and State of Minnesota, have invented certain new and useful Improvements in Autosleds; and I do hereby declare the following to be a full, clear, and exact description of the invention, such as will enable others skilled in the art to which it appertains to make and use the same.

My invention relates to improvements in power propelled sleds, and to this end, it consists of the novel devices and combinations of devices hereinafter described and defined in the claims.

The invention is illustrated in the accompanying drawings, wherein like characters indicate like parts throughout the several views.

Referring to the drawings, Figure 1 is a side elevation of the improved device, some parts being broken away, and some exposed parts shown in section; Fig. 2 is a plan view of the improved device, some parts being removed, other parts being broken away, and still other parts being shown in horizontal section; and Fig. 3 is a detail view partly in elevation and partly in vertical section taken on the line $x^5$ $x^5$ of Fig. 1.

The numeral 1 indicates, as an entirety, the body of the power propelled sled, as shown, of the automobile type. This body 1 is supported from a front bolster 2, and a rear bolster 3, by a pair of front springs 4 and a pair of rear springs 5. To the ends of the front bolster 2 is rigidly secured a pair of depending legs 6, and to the ends of the rear bolster 3 is also rigidly secured a pair of depending legs 7. At their lower ends, the legs 6 and 7 are bifurcated and bent laterally rearward, as shown in Figs. 1 and 3. Between the prongs of the bifurcated ends of the legs 6 and 7 are mounted a pair of front runners 8 and a pair of rear runners 9, respectively. These runners 8 and 9 are connected to the bifurcated ends of the legs 6 and 7, for limited vertical oscillatory movements by pivot pins 10. Obviously, the rear extensions of the bifurcated ends of the legs 6 and 7 hold the runners 8 and 9 against lateral twisting movement.

For imparting simultaneous steering movements to the runners 8 and 9, a steering post 11 is mounted on the body 1. To the upper end of the steering post 11 is secured the customary steering wheel 12. Suitable connections from the steering post 11 to the legs 6 and 7 will, in actual practice, be provided for imparting simultaneous steering movements to the runners 8 and 9 but, for the purpose of this case, it is not thought necessary to illustrate the same.

Within the body 1 is mounted an explosive engine of any desired make or design, and is indicated in diagram and as an entirety by the numeral 24. Secured to the sills of the body 1, forward of the engine 24, is a transversely extended plate 25 having integrally formed on its rear edge bearing lugs 26, in which is rotatively mounted a transversely divided shaft 27. To one of the sections of the shaft 27 is keyed or otherwise secured a master bevel gear 28, of a differential gear mechanism, that meshes with a bevel pinion 29, keyed or otherwise secured to the engine shaft 30. A pair of bearings 31 is secured to the face of the bevel gear 28. Within these bearings 31 is journaled a pair of axially alined bevel pinions 32, that work between and mesh with a pair of oppositely projecting bevel gears 33 that are keyed or otherwise secured, one to the inner end of each of the two sections of the shaft 27. The outer ends of the shaft 27 project outward of the sills of the body 1, and have pivotally mounted thereon a pair of downwardly and rearwardly projecting arms 34. The upper or forward ends of these arms 34 are bifurcated and the prongs thereof are pivotally mounted on the shaft 27, and the rear or lower ends of said arms 34 are bent laterally and horizontally outward to form a pair of journals 35. On each journal 35 is rotatively mounted a toothed driving wheel 36, comprising a hub 37, having rigidly secured thereto radially projecting spokes 38, which terminate at their outer ends in wedge-shaped road or ground engaging points or teeth 39. The outer ends of each set of spokes 38, just inward of their points 39, are clamped and rigidly secured between a pair of annular rings 40.

The driving wheels 36 are independently driven from the shaft 27 by a pair of sprocket chains 41, which run over a pair of large sprocket wheels 42 and a pair of small sprocket wheels 43. The sprocket wheels 42 are rigidly secured, one to the inner face of each driving wheel 36. And the small sprocket wheels 43, which are alined with said sprocket wheels 42, are keyed or otherwise secured, one to each of the sections of the shaft 27, between the prongs of the bifurcated ends of the arms 34. A pair of springs 44 is provided for yieldingly holding the driving wheels 36 in contact with the road or ground. The intermediate portions of these springs 44 are coiled about the shaft 27 at points between the sills of the body 1 and the arms 34, as shown in Fig. 2, and one of the ends of each of the said springs 44 is anchored to the intermediate portions of the adjacent arms 34.

For independently placing the springs 44 under a variable tension, a pair of foot operated levers 45 is mounted in the foot board of the body 1. Each lever 45 is pivotally secured to the intermediate joints of a pair of toggle levers 46 and 47, comprising a long link and a short link. The free ends of the short links of the toggle levers 46 and 47 are pivotally anchored to a transversely extended shaft 48, which, in turn, is secured at its ends to the sills of the body 1.

The free end of the long link of the toggle lever 46 is pivotally secured to a normally downward and rearwardly projecting arm 49, having a hub 50. This hub 50 is loosely journaled on a horizontal, transversely extended rock shaft 51, journaled at its end in the sills of the bottom 1. Integrally formed on the hub 50 is a normally upwardly and rearwardly projecting arm 52, the free end of which is secured to the free end of the adjacent spring 44. To the rock shaft 51 is rigidly connected an arm 53, which normally projects in the same direction as the arm 49, and to the end of which is pivotally secured the free end of the long link of the toggle lever 47. Also rigidly secured to the rock shaft 51 is an arm 54, which normally projects in the same direction as the arm 52, and is secured to the free end of the other or adjacent spring 44.

What I claim is:—

1. In a power propelled sled, the combination with a sectional shaft journaled on said sled, differential gear mechanism connecting the sections of said shaft, and means for driving said differential gear mechanism, of a pair of arms pivotally connected to said shaft, toothed driving wheels journaled on said arms, sprocket wheels and sprocket chains for driving said wheels from said shaft, springs yieldingly forcing said toothed wheels into engagement with the road, and independent foot operative means for independently varying the tension of said springs, substantially as described.

2. In a power propelled sled, the combination with a sectional shaft mounted on said sled, differential gear mechanism connecting the sections of said shaft, and means for driving said differential gear mechanism, of a pair of rearwardly and downwardly projecting arms pivotally connected at their upper ends to said shaft, toothed driving wheels journaled on the free ends of said arms, sprocket wheels and sprocket chains for driving said wheels from said shaft, springs yieldingly forcing said toothed driving wheels into engagement with the road, and connections for independently varying the tension of said spring, including independent foot operative toggle levers, substantially as described.

In testimony whereof I affix my signature in presence of two witnesses.

MICHAEL WEIDNER.

Witnesses:
  EDITH SIMERMAN,
  HARRY D. KILGORE.

---

Copies of this patent may be obtained for five cents each, by addressing the "Commissioner of Patents, Washington, D. C."